United States Patent
Hosseini et al.

(10) Patent No.: US 11,553,477 B2
(45) Date of Patent: Jan. 10, 2023

(54) DYNAMIC SWITCHING AMONG SIDELINK BANDWIDTH PARTS ASSOCIATED WITH SIDELINK COMMUNICATION

(71) Applicant: QUALCOMM Incorporated, San Diego, CA (US)

(72) Inventors: Seyedkianoush Hosseini, San Diego, CA (US); Wei Yang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/133,350

(22) Filed: Dec. 23, 2020

(65) Prior Publication Data
US 2022/0201661 A1    Jun. 23, 2022

(51) Int. Cl.
*H04W 72/04*    (2009.01)

(52) U.S. Cl.
CPC .................................. *H04W 72/042* (2013.01)

(58) Field of Classification Search
CPC . H04W 72/042; H04W 76/27; H04W 72/121; H04W 72/0453; H04W 28/26; H04W 72/02
See application file for complete search history.

(56) References Cited

U.S. PATENT DOCUMENTS

| | | | |
|---|---|---|---|
| 2020/0029318 A1* | 1/2020 | Guo | H04L 1/1819 |
| 2020/0053675 A1* | 2/2020 | Khoryaev | H04L 5/0051 |
| 2020/0328865 A1* | 10/2020 | Choi | H04W 8/24 |
| 2021/0091912 A1* | 3/2021 | Tang | H04W 72/0453 |
| 2021/0168814 A1* | 6/2021 | Chen | H04W 72/0493 |
| 2021/0195593 A1* | 6/2021 | Shen | H04L 5/14 |
| 2021/0250957 A1* | 8/2021 | Roth-Mandut | H04W 28/26 |
| 2021/0306984 A1* | 9/2021 | Lee | H04W 72/02 |
| 2021/0360590 A1* | 11/2021 | Lee | H04L 5/0091 |
| 2021/0368479 A1* | 11/2021 | Yu | H04W 72/02 |
| 2022/0014980 A1* | 1/2022 | Tseng | H04W 36/08 |
| 2022/0070878 A1* | 3/2022 | Lee | H04W 4/40 |
| 2022/0110067 A1* | 4/2022 | Ryu | H04W 52/383 |

\* cited by examiner

*Primary Examiner* — Chi Ho A Lee
(74) *Attorney, Agent, or Firm* — Harrity & Harrity, LLP

(57) ABSTRACT

Various aspects of the present disclosure generally relate to wireless communication. In some aspects, a user equipment (UE) may receive switching information to switch from utilizing a first sidelink bandwidth part (SL-BWP) to utilizing a second SL-BWP, the first SL-BWP and the second SL-BWP being configured for sidelink communications. The UE may transmit or receive data associated with a sidelink communication based at least in part on the switching information. Numerous other aspects are provided.

30 Claims, 7 Drawing Sheets

DYNAMIC SWITCHING AMONG SIDELINK BANDWIDTH PARTS ASSOCIATED WITH SIDELINK COMMUNICATION

FIELD OF THE DISCLOSURE

Aspects of the present disclosure generally relate to wireless communication and to techniques and apparatuses for dynamic switching among sidelink bandwidth parts (SL-BWPs) associated with sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving switching information to switch from utilizing a first sidelink bandwidth part (SL-BWP) to utilizing a second SL-BWP, the first SL-BWP and the second SL-BWP being configured for sidelink communications; and transmitting or receiving data associated with a sidelink communication based at least in part on the switching information.

In some aspects, a UE for wireless communication includes a memory; and one or more processors operatively coupled to the memory, the memory and the one or more processors configured to: receive switching information to switch from utilizing a first SL-BWP to utilizing a second SL-BWP, the first SL-BWP and the second SL-BWP being configured for sidelink communications; and transmit or receive data associated with a sidelink communication based at least in part on the switching information.

In some aspects, a non-transitory computer-readable medium storing a set of instructions for wireless communication includes one or more instructions that, when executed by one or more processors of a UE, cause the UE to: receive switching information to switch from utilizing a first SL-BWP to utilizing a second SL-BWP, the first SL-BWP and the second SL-BWP being configured for sidelink communications; and transmit or receive data associated with a sidelink communication based at least in part on the switching information.

In some aspects, an apparatus for wireless communication includes means for receiving switching information to switch from utilizing a first SL-BWP to utilizing a second SL-BWP, the first SL-BWP and the second SL-BWP being configured for sidelink communications; and means for transmitting or receiving data associated with a sidelink communication based at least in part on the switching information.

Aspects generally include a method, apparatus, system, computer program product, non-transitory computer-readable medium, user equipment, base station, transmitter, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
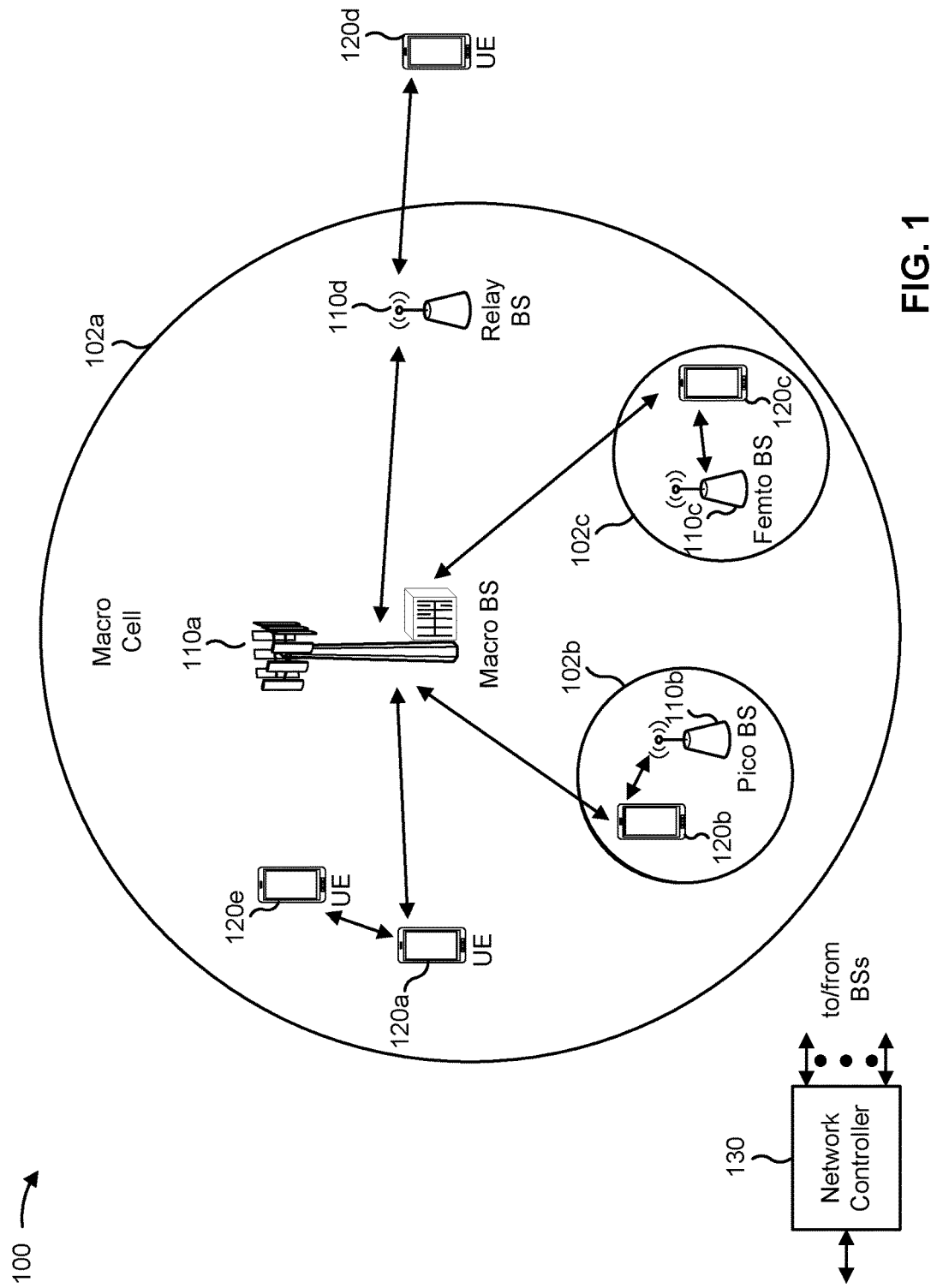
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
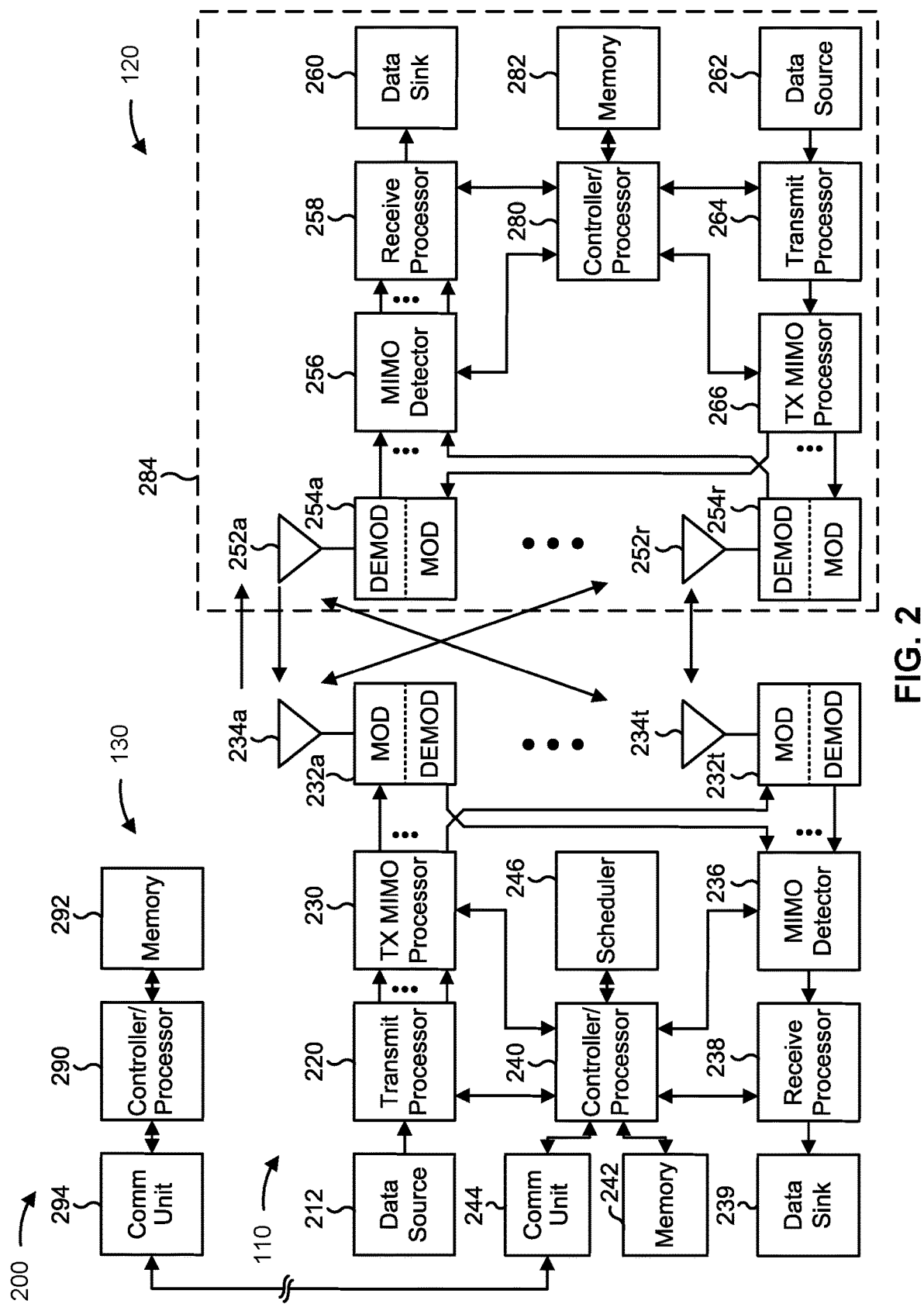
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with dynamic switching among sidelink bandwidth parts (SL-BWPs) associated with sidelink communication, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for receiving switching information to switch from utilizing a first sidelink bandwidth part (SL-BWP) to utilizing a second SL-BWP, the first SL-BWP and the second SL-BWP being configured for sidelink communications; means for transmitting or receiving data associated with a sidelink communication based at least in part on the switching information; among other examples. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for switching from utilizing the first SL-BWP to utilizing the second SL-BWP based at least in part on the switching information.

In some aspects, the UE 120 includes means for transmitting, to another UE in the group of UEs, a respective switch-indication associated with the other UE.

In some aspects, the UE 120 includes means for transmitting a subset of the respective switch-indications to a plurality of UEs in the group of UEs.

In some aspects, the UE 120 includes means for switching from utilizing the first SL-BWP to utilizing the second SL-BWP based at least in part on the switching information; or means for informing another UE associated with the sidelink communication of the switching by the UE 120.

In some aspects, the UE 120 includes means for transmitting, based at least in part on receiving the switching information, a feedback message utilizing an uplink control channel associated with the second SL-BWP when a sidelink resource is scheduled in the second SL-BWP.

In some aspects, the UE 120 includes means for switching from utilizing the first SL-BWP to utilizing the second SL-BWP in relation to transmitting a feedback message associated with receiving the switching information when a sidelink resource is not scheduled in the second SL-BWP.

In some aspects, the UE 120 includes means for switching from utilizing the first SL-BWP to utilizing the second SL-BWP based at least in part on the switching information; means for receiving an indication of a sidelink resource, to be utilized for sending information regarding the switching to another UE associated with the sidelink communication, when the sidelink resource is scheduled in the second SL-BWP; or means for utilizing the sidelink resource to send the information regarding the switching to the other UE.

In some aspects, the UE 120 includes means for switching from utilizing the first SL-BWP to utilizing the second SL-BWP; or means for transmitting a feedback message, based at least in part on receiving the switching information, when a sidelink resource is scheduled in the second SL-BWP, wherein a duration of a time gap between receiving the switching information and transmitting the feedback message is long enough to account for receiving a sidelink feedback message from another UE associated with the sidelink communication.

In some aspects, the UE 120 includes means for transmitting, based at least in part on receiving a negative feedback message from another UE associated with the sidelink communication, a negative feedback message indicating a failure to switch to utilizing the second SL-BWP when a sidelink resource.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A sidelink network may include a base station and a plurality of UEs. The base station may communicate with each of the plurality of UEs via respective access links. The plurality of UEs may operate in sidelink modes to communicate (e.g., transmit and/or receive data) with one another via one or more sidelink channels.

In one sidelink mode (e.g., Mode-1 Resource Allocation Mode), the base station may configure and control utilization of sidelink resources (e.g., radio interface resources such as frequency resources and/or time resources) accessible for sidelink communications. For instance, the base station may configure a predetermined number of sidelink resources, associated with a sidelink channel, and a transmitting UE may utilize the predetermined number of sidelink resources to transmit data to a receiving UE over the sidelink channel. The base station may be using the transmitting UE as a relay device to extend coverage to the receiving UE, which may be experiencing poor coverage due to, for example, a poor radio link quality. The base station may alternatively use a network node, deployed by an operator of the sidelink network, as the relay device.

In another sidelink mode (e.g., Mode-2 Resource Allocation Mode), the base station may configure the predetermined number of sidelink resources accessible for sidelink communication. The plurality of UEs, and not the base station, may control utilization of the predetermined number of sidelink resources by performing scheduling of communications in the sidelink network. For instance, the transmitting UE may autonomously schedule utilization of the predetermined number of sidelink resources to transmit data to the receiving UE.

In either sidelink mode, each of the plurality of UEs in the sidelink network may utilize a fixed amount of bandwidth due to utilizing the predetermined number of sidelink resources. For instance, the transmitting UE may utilize a threshold amount of processing power to perform transmission operations associated with utilizing the predetermined number of sidelink resources for every transmission, including when the transmitting UE transmits a nominal amount of data. Similarly, the receiving UE may utilize a threshold amount of processing power to perform reception operations associated with utilizing the predetermined number of sidelink resources for every reception, including when the receiving UE receives the nominal amount of data. As a result, regardless of an amount of data to be communicated, each of the plurality of UEs may utilize a threshold amount of processing power to perform communication operations (e.g., transmission or reception operations) associated with utilizing the predetermined number of sidelink resources for each communication.

Some UEs may be designed for efficient power consumption. Examples of such UEs include MTC UEs and/or NB-IoT devices that may be deployed in the field to perform, for example, infrequent and/or simple communication tasks, and may be provided with single-charge battery solutions. Additional examples include peripheral devices such as biometric sensors/devices or wearable devices (e.g., smart watches, smart clothing, smart glasses, smart ring, smart bracelet, or the like) that are sensitive to excessive power consumption. For such UEs, which can benefit from techniques that curtail power consumption, utilizing the threshold amount of processing power for performing the communication operations associated with utilizing the predetermined number of sidelink resources for each communication may be impracticable.

Further, because the plurality of UEs may not adjust a number of utilized sidelink resources (e.g., reduce the number of utilized sidelink resources for transmission/reception of, for example, the nominal amount of data), a plurality of sidelink resources may remain unutilized during communication of the nominal amount of data. As a result, resource utilization in the sidelink network may be rendered inefficient.

Various aspects of techniques and apparatuses described herein may allow provision of dynamic switching among SL-BWPs associated with sidelink communication. In a sidelink network including a plurality of UEs, a transmission from a transmitting UE may be received by one or more of the other of the plurality of UEs (e.g., receiving UEs). The dynamic switching among SL-BWPs, as described herein, may assist in adjusting a number of utilized sidelink resources based at least in part on an operation of the UEs in the sidelink network. In some aspects, the SL-BWPs may have varying bandwidths, which may enable the transmitting UE to efficiently utilize sidelink resources based at least in part on an amount of data to be communicated, thereby allowing unutilized sidelink resources to remain available for other purposes. For instance, the transmitting UE may be enabled to utilize a first SL-BWP, having a smaller bandwidth with respect to a second SL-BWP, while transmitting a nominal amount of data, thereby allowing sidelink resources associated with the second SL-BWP to remain available for other purposes. Based at least in part on efficiently utilizing the sidelink resources, the transmitting and receiving UEs may curtail power consumption associated with performing communication operations. For instance, a transmitting UE and a receiving UE utilizing, for example, the first SL-BWP to communicate the nominal amount of data may expend less than a threshold amount of processing power to perform communication operations associated with utilizing the predetermined number of sidelink resources. In this way, the plurality of UEs may enable optimized resource utilization and optimized power consumption while communicating in the sidelink network.

In some aspects, a UE may receive switching information to switch from utilizing a first SL-BWP to utilizing a second SL-BWP, the first SL-BWP and the second SL-BWP being configured for sidelink communications, and may transmit or receive data associated with a sidelink communication based at least in part on the switching information.

Figure 3:
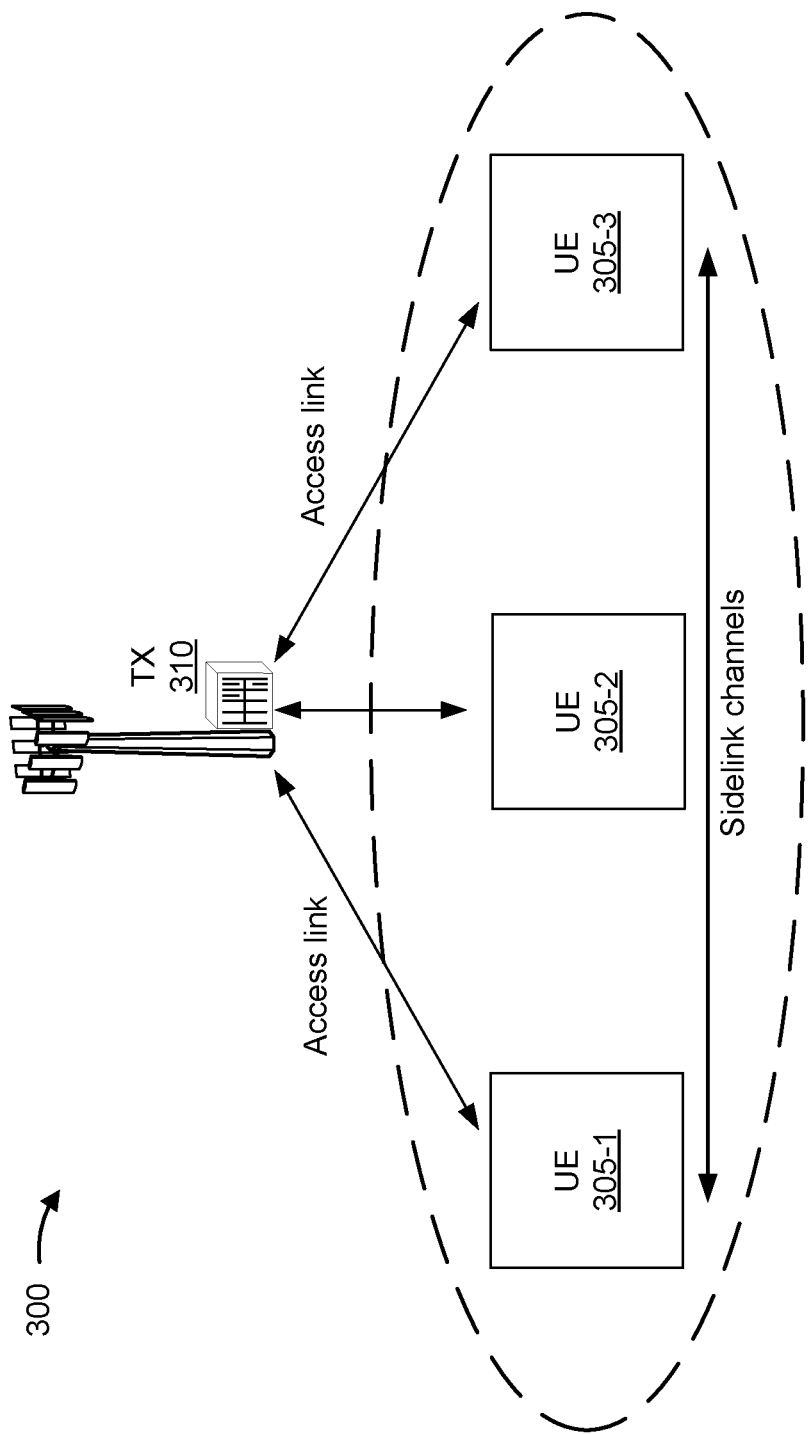
FIG. 3 is a diagram illustrating an example associated with dynamic switching among SL-BWPs associated with sidelink communication, in accordance with various aspects of the present disclosure.

FIG. 3 is a diagram illustrating an example 300 associated with dynamic switching among sidelink bandwidth parts (SL-BWPs) associated with sidelink communication, in accordance with various aspects of the present disclosure. The sidelink communication may occur in a sidelink network including a transmitter (TX) 310 and a plurality of UEs (shown as UE 305-1, UE 305-2, and UE 305-3). The TX 310 may include, for example, a base station (e.g., BS 110) or a relay device. The relay device may include a network node such as, for example, a relay BS, a relay UE, and/or an integrated access and backhaul (IAB) node. As shown in FIG. 3, the UE 305-1, the UE 305-2, and the UE 305-3 (collectively referred to as UEs 305) may conduct the sidelink communication by communicating (e.g., transmitting and/or receiving data) with one another via one or more sidelink channels in a sidelink mode. In the sidelink network, a transmitting UE may communicate with one or more of the other plurality of UEs (e.g., receiving UEs). The UEs 305 may include one or more UEs described elsewhere herein, such as UE 120 discussed with respect to FIG. 2.

In some aspects, the one or more sidelink channels among the UEs 305 may be implemented utilizing, for example, a PC5 interface and an access link between the TX 310 and a UE (e.g., the UE 305-1, the UE 305-2, or the UE 305-3) may be implemented utilizing, for example, a Uu interface. Sidelink communications may be transmitted and received via the sidelink channels and access link communications may be transmitted and received via the access links. The TX 310 may communicate with the UE 305-1 via a first access link, communicate with the UE 305-2 via a second access link, and/or communicate with the UE 305-3 via a third access link.

As indicated above, FIG. 3 is provided as an example. Other examples may differ from what is described with respect to FIG. 3.

Figure 4:
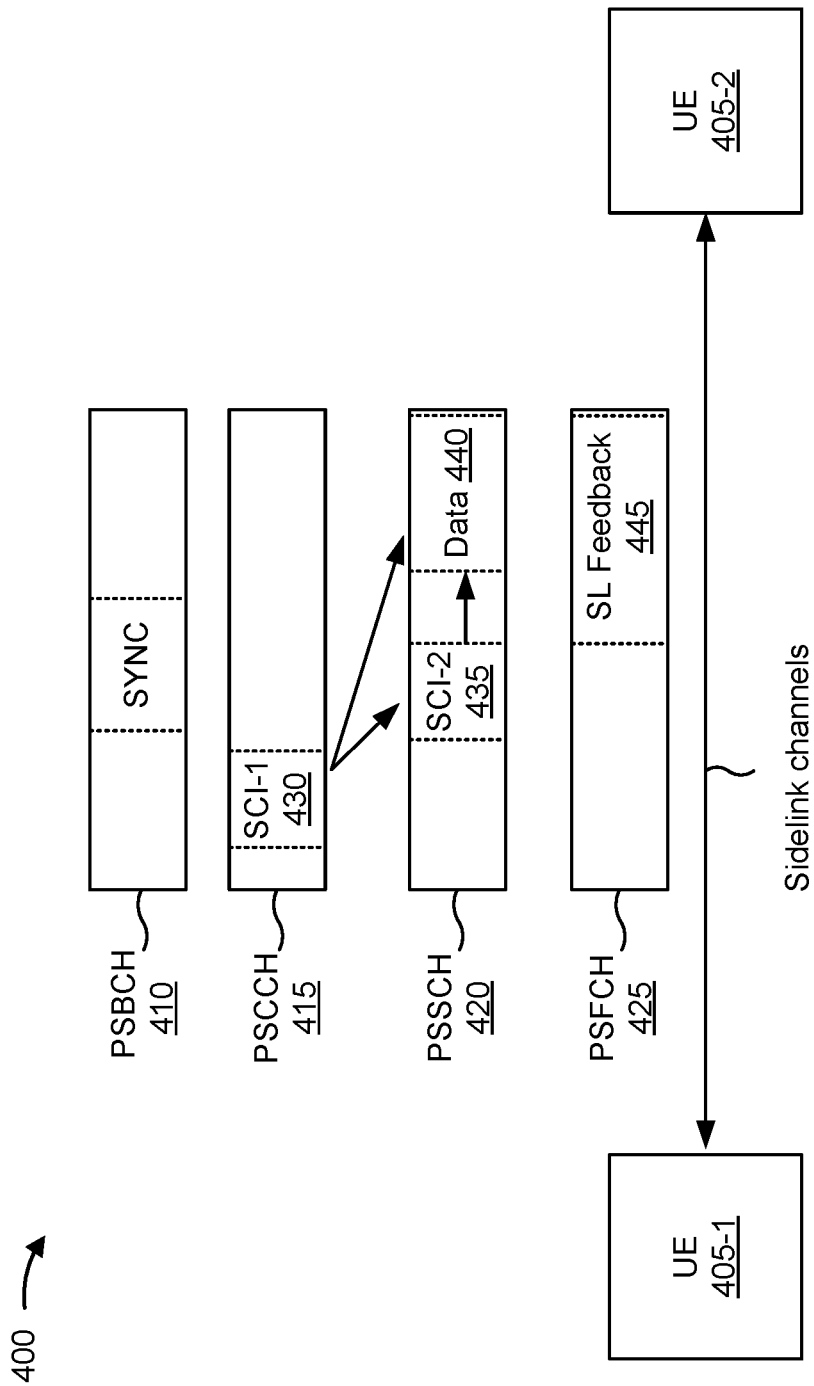
FIG. 4 is a diagram illustrating an example associated with dynamic switching among SL-BWPs associated with sidelink communication, in accordance with various aspects of the present disclosure.

FIG. 4 is a diagram illustrating an example 400 associated with dynamic switching among sidelink bandwidth parts (SL-BWPs) associated with sidelink communication, in accordance with various aspects of the present disclosure. The sidelink communication may take place in a sidelink network including a plurality of UEs including, for example, UE 405-1 and UE 405-2 communicating with each other using one or more sidelink channels. In some aspects, more than two UEs may be included in the sidelink network. The plurality of UEs included in the sidelink network may include a plurality of UEs within a given geographical area (e.g., a given radius around a given UE). In some aspects, the plurality of UEs included in the sidelink network may provide a UE density associated with the sidelink network.

For example, the UE density may identify a number of UEs within a threshold distance of, for example, the UE 405-1. In some aspects, the UE 405-1 and/or the UE 405-2 may include one or more UEs described elsewhere herein, such as UE 120 discussed with respect to FIG. 2 and/or the UEs 305 discussed with respect to FIG. 3.

As shown in FIG. 4, the UE 405-1 may communicate with the UE 405-2 via sidelink channels. Communications utilizing the one or more sidelink channels may include, for example, P2P communications, D2D communications, V2X communications (e.g., V2V communications, V2I communications, and/or vehicle-to-person (V2P) communications), and/or mesh networking communications.

In some aspects, the sidelink channels may use a PC5 interface and/or may operate in, for example, a high frequency band (e.g., the 5.9 GHz band) and/or an unlicensed or shared frequency band (e.g., an NR unlicensed (NR-U) frequency band). Additionally, or alternatively, the UEs 405-1, 405-2 may synchronize timing of transmission time intervals (TTIs) (e.g., frames, subframes, slots, and/or symbols) using global navigation satellite system (GNSS) timing.

As further shown in FIG. 4, the sidelink channels may include, for example, a physical sidelink broadcast channel (PSBCH) 410, a physical sidelink control channel (PSCCH) 415, a physical sidelink shared channel (PSSCH) 420, and/or a physical sidelink feedback channel (PSFCH) 425. The PSBCH 410 may be used to communicate sidelink synchronization (SYNC) signals. The PSCCH 415 may be used to communicate control information, similar to a physical downlink control channel (PDCCH) and/or a physical uplink control channel (PUCCH) used for cellular communications with a transmitter (e.g., TX 310) via an access link or an access channel. In some aspects, a transmitting UE may use the PSCCH to transmit, and a receiving UE may use the PSCCH to receive, information (e.g., switching information) associated with switching among SL-BWPs. The PSSCH 420 may be used to communicate data, similar to a physical downlink shared channel (PDSCH) and/or a physical uplink shared channel (PUSCH) used for cellular communications with the transmitter (e.g., TX 310) via an access link or an access channel.

The sidelink channels may carry sidelink control information (SCI) to indicate various control information used for sidelink communications. The sidelink control information may include, for example, sidelink control information part 1 (SCI-1) 430 and sidelink control information part 2 (SCI-2) 435. The SCI-1 430 may be included in the PSCCH 415 and the SCI-2 435 may be included in the PSSCH 420. The SCI-1 430 may include switching information, a scheduling assignment regarding one or more resources of the sidelink channels (e.g., time resources, frequency resources, and/or spatial resources), or the like. The SCI-2 435 may include various types of information, such as, for example, a hybrid automatic repeat request (HARQ) process ID, a new data indicator (NDI) associated with the data 440, a unique identifier associated with a transmitting UE (a unique TX ID), a unique identifier associated with a receiving UE (a unique RX ID), and/or a channel state information (CSI) report trigger.

The PSSCH 420 may also include data 440 and information such as, for example, information for decoding sidelink communications on the PSSCH 420, a quality of service (QoS) priority value, a resource reservation period, a PSSCH demodulation reference signal (DMRS) pattern, an SCI format and/or a beta offset for sidelink control information part 2 (SCI-2) 435 transmitted on the PSSCH 420, a quantity of PSSCH DMRS ports, a medium access control (MAC) message including a MAC control element (MAC-CE), and/or a modulation coding scheme (MCS). The MAC-CE may be used to communicate, for example, messages associated with utilization of bandwidth parts (BWPs) configured for the sidelink network. For instance, the MAC-CE may be used to communicate a confirmation message and/or a rejection message associated with utilization of the BWPs.

In some aspects, the UE 405-1 may transmit both the SCI-1 430 and the SCI-2 435. In some aspects, the UE 405-1 may transmit only SCI-1 430, in which case one or more types of the information that would otherwise be transmitted in the SCI-2 435 may be transmitted in the SCI-1 430 instead. The PSFCH 425 may be used to communicate sidelink (SL) feedback 445, such as, for example, HARQ feedback messages (e.g., acknowledgement or negative acknowledgement (ACK/NACK) information), transmit power control (TPC), and/or a scheduling request (SR).

In some aspects, the one or more sidelink channels may use configured sidelink resources (configured by, for example, TX 310) shared by the plurality of UEs. In some aspects, a scheduling assignment (e.g., included in SCI-1 430) may be transmitted in sub-channels using specific resource blocks (RBs) across time. In some aspects, data 440 (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions may be transmitted using non-adjacent RBs.

The configured sidelink resources may include resource blocks, subchannels, resource pools, sidelink bandwidth parts (SL-BWPs), and/or the like. A resource block, a subchannel, a resource pool, and/or a sidelink bandwidth part (SL-BWP) may be a resource in a frequency domain and may be described with respect to a starting frequency and a bandwidth, and/or may be associated with a subcarrier spacing. In some aspects, a subchannel may include one or more resource blocks, a resource pool may include one or more subchannels, and/or a SL-BWP may include one or more resource pools. In some aspects, the transmitter (e.g., TX 310) may configure the sidelink network with one or more SL-BWPs to facilitate utilization of sidelink resources for sidelink communication (e.g., transmitting and/or receiving data). Each of the plurality of UEs may utilize the one or more configured SL-BWPs to transmit data to receiving UEs and/or receive data from a transmitting UE in the sidelink network. In some aspects, a resource requirement of the sidelink network may vary over time. In some aspects, the resource requirement of the sidelink network may vary based at least in part on a number of the plurality of UEs included in the sidelink network. Also, as discussed in further detail with respect to FIG. 5, the plurality of UEs may switch from utilizing a first configured SL-BWP to utilizing another configured SL-BWP. As disclosed herein, the description with respect to BWPs may analogously apply to resource pools. For instance, the UE may analogously switch from utilizing a first configured resource pool to utilizing another configured resource pool.

As indicated above, FIG. 4 is provided as an example. Other examples may differ from what is described with respect to FIG. 4.

Figure 5:
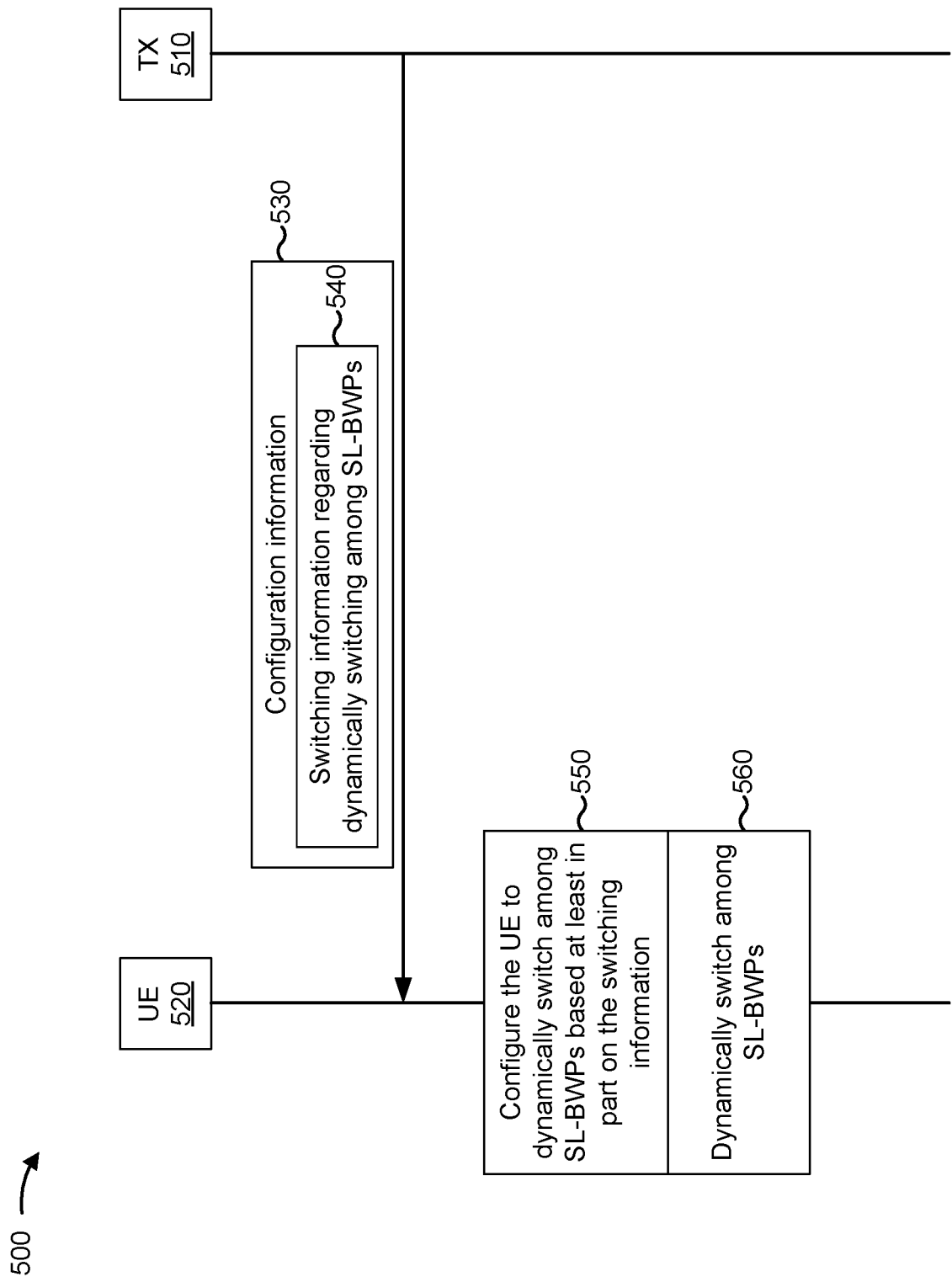
FIG. 5 is a diagram illustrating an example associated with dynamic switching among SL-BWPs associated with sidelink communication, in accordance with various aspects of the present disclosure.

FIG. 5 is a diagram illustrating an example 500 associated with dynamic switching among SL-BWPs associated with sidelink communication, in accordance with various aspects of the present disclosure. FIG. 5 shows a TX 510 (e.g., a base station or a relay device) and a UE 520 conducting data communication in a wireless network, such as an LTE network or a 5G/NR network. The data communication may include downlink communications from the TX 510 to the UE 520 and/or uplink communications from the UE 520 to the TX 510. The uplink and downlink communications may include, for example, signaling data and/or payload data.

In some aspects, the UE 520 may be included in a sidelink network along with one or more other UEs (collectively referred to as the UEs 520). The UEs 520 may operate in, for example, a sidelink mode (e.g., Mode-1 Resource Allocation Mode) in which the TX 510 may configure and control utilization of sidelink resources by the UEs 520. The UEs 520 may include, for example, one or more UEs discussed elsewhere herein, such as the UE 120 discussed with respect to FIG. 2, the UE 305 discussed with respect to FIG. 3, and/or the UE 405 discussed with respect to FIG. 4. The TX 510 may include, for example, a base station (e.g., BS 110) or a relay device. The relay device may include a network node such as, for example, a relay BS, a relay UE, and/or an integrated access and backhaul (IAB) node.

As shown by reference number 530, the TX 510 may transmit, and the UE 520 may receive, configuration information at a beginning of and/or during the data communication. In some aspects, the UE 520 may receive the configuration information from another device (e.g., from another base station or another UE). In some aspects, the UE 520 may receive the configuration information via, for example, RRC signaling and/or medium access control (MAC) signaling (e.g., a MAC control element (MAC-CE)).

In some aspects, the configuration information may include information associated with configured sidelink resources (e.g., frequency resources (subchannels)) to be utilized by the UE 520 for sidelink communication. For instance, the configuration information may include information (e.g., resource allocation information) associated with configured SL-BWPs to be utilized by the UE 520 for sidelink communication. In some aspects, the configured SL-BWPs may be associated with varying bandwidths (e.g., varying numbers of sidelink resources). For instance, a first SL-BWP, from among the configured SL-BWPs, may be associated with a first number of sidelink resources, and a second SL-BWP, from among the configured SL-BWPs, may be associated with a second number of sidelink resources. In some aspects, the second number of sidelink resources may be fewer than the first number of sidelink resources.

The information associated with the configured SL-BWPs may be received via downlink control information (DCI) over a physical downlink control channel (PDCCH). In some aspects, a plurality of formats may be associated with the DCI (e.g., DCI formats) based at least in part on how information (e.g., resource allocation of SL-BWPs) may be packaged and received via the PDCCH. In some aspects, the DCI formats may assist the UE 520 in locating and decoding data received over, for example, a physical downlink shared channel (PDSCH). In some aspects, the DCI formats may carry information (e.g., resource allocation information and/or switching information) associated with SL-BWPs to be utilized by the UE 520 for sidelink communication.

As shown by reference number 540, the information associated with the configured SL-BWPs may include switching information associated with dynamically switching from utilizing, for example, the first SL-BWP to utilizing, for example, the second SL-BWP. As shown by reference number 550, the UE 520 may configure the UE 520 to dynamically switch among configured SL-BWPs based at least in part on the switching information.

In some aspects, a DCI format may be used to indicate the dynamic switching among the SL-BWPs. For instance, a DCI format may include formats associated with format 0, format 1, format 2, and/or format 3 (e.g., 0_1, 1_1, 0_2, 2_2, 3_x). The DCI format may include a SL-BWP switching field, which may include a codepoint mapped to indicate an identifier of the first SL-BWP and/or an identifier of the second SL-BWP. In some aspects, the codepoint may be mapped to indicate a plurality of identifiers. In this case, the codepoint may indicate identifiers of both the first SL-BWP and the second SL-BWP.

Based at least in part on the DCI format including the SL-BWP switching field with the codepoint indicating one or more identifiers, the UE 520 may configure the UE 520 to dynamically switch among the SL-BWPs. In an example, based at least in part on receiving a codepoint (e.g., format 3 codepoint) indicating an identifier of the second SL-BWP, the UE 520 may dynamically switch from utilizing the first SL-BWP to utilizing the second SL-BWP. In another example, based at least in part on receiving the codepoint (e.g., format 0 codepoint, format 1 codepoint, or format 2 codepoint) indicating identifiers of both the first SL-BWP and the second SL-BWP, the UE 520 may dynamically switch from utilizing the first SL-BWP (i.e., the SL-BWP actively being used) to utilizing the second SL-BWP. In some aspects, the codepoint may also include information associated with switching among BWPs configured for access link communication between the TX 510 and the UE 520.

In some aspects, the UE 520 may receive a particular DCI format, that may be different from format 0, format 1, format 2, and/or format 3 (e.g., 0_1, 1_1, 0_2, 2_2, 3_x). The particular DCI may include a UE-specific switch-indication for the UE 520 to dynamically switch among the SL-BWPs (e.g., switch from utilizing the first SL-BWP to utilizing the second SL-BWP).

Alternatively, the particular DCI may include a group-common DCI that includes respective switch-indications, associated with the UEs 520, to dynamically switch among the SL-BWPs. In some aspects, the particular DCI may include a respective index, associated with the UE 520, to enable the UE 520 to find a switch-indication, from among the respective switch-indications associated with the UEs 520, and dynamically switch among the SL-BWPs. In some aspects, the respective switch-indication may be found within a payload associated with the particular DCI.

In some aspects, the sidelink resources to be utilized by the UE 520 may be configured to include sidelink carriers to support sidelink carrier aggregation. In this case, the UE 520 may receive a group-common DCI that includes the respective switch-indications for the UEs 520. The UE 520 may act as a relay node to relay the respective switch-indications to the other of the UEs 520. Based at least in part on receiving the group-common DCI, the UE 520 may transmit the respective switch-indications to the respective UEs 520 utilizing different sidelink carriers configured to support the sidelink carrier aggregation.

In some aspects, based at least in part on the respective indices, the UE 520, while acting as the relay node, may determine an association between the respective switch-indications and the UEs 520. For instance, the UE 520, while acting as the relay node, may determine which switch-indication, from among the respective switch-indications, is directed to which UE, from among the UEs 520. Based at least in part on the determination, the UE 520 may transmit, in separate transmissions, the respective switch-indications to the UEs to which the respective switch-indications are directed. For instance, the UE 520 may transmit to a first UE, from among the UEs 520, a respective switch-indication directed to the first UE in a first transmission and may transmit to a second UE, from among the UEs 520, a respective switch-indication directed to the second UE in a second transmission.

Alternatively, the UE 520, while acting as the relay node, may transmit the respective switch-indications, directed to the UEs 520, in a joint transmission. In some aspects, the UE 520 may transmit a subset of the respective switch-indications. In some aspects, the subset may not include the respective switch-indication directed to the UE 520.

As shown by reference number 560, based at least in part on receiving the switching information, the UE 520 dynamically switches among the SL-BWPs. In one example, a first UE 520, from among the UEs 520, may switch from utilizing the first SL-BWP to utilizing the second SL-BWP. In this case, a second UE 520, from among the UEs 520 and utilizing the first SL-BWP to conduct sidelink communication with the first UE 520, may receive switching information from the TX 510 to also switch from utilizing the first SL-BWP to utilizing the second SL-BWP. As a result, the first UE 520 and the second UE 520 may continue the sidelink communication utilizing the second SL-BWP.

Alternatively, the second UE 520 may not be within a coverage area of the TX 510 or may be experiencing interference (e.g., physical blockage, inter-symbol interference, or the like) such that the second UE 520 may not be able to receive the switching information from the TX 510. In this case, the first UE 520 may inform the second UE 520 to switch from utilizing the first SL-BWP to utilizing the second SL-BWP. For instance, the first UE 520 may receive from the TX 510, and relay (e.g., transmit) to the second UE 520, switching information directed to the second UE 520.

In some aspects, the UEs 520 may transmit a feedback message to the TX 510 based at least in part on receiving the switching information. In some aspects, transmission of the feedback message may be based at least in part on whether a UE 520 receives the switching information from the TX 510 or from another UE 520. Additionally, or alternatively, transmission of the feedback message may be based at least in part on whether the switching information includes information regarding scheduling of a sidelink resource in the first SL-BWP and/or the second SL-BWP. Additionally, or alternatively, transmission of the feedback message may be based at least in part on whether HARQ feedback is configured for the first SL-BWP and/or the second SL-BWP.

For instance, in some aspects, when the second UE 520 receives the switching information from the TX 510, the switching information indicates that a sidelink resource is scheduled, and the HARQ feedback is configured, the first UE 520 and/or the second UE 520 may transmit the feedback message to the TX 510 utilizing a physical uplink control channel (PUCCH). In some aspects, based at least in part on transmission of the feedback message, the first UE 520 and/or the second UE 520 may inform the TX 510 of receipt of the switching information.

In some aspects, when the second UE 520 receives the switching information from the TX 510, the switching information indicates that no sidelink resource is scheduled, and HARQ feedback is configured, the first UE 520 and/or the second UE 520 may switch from utilizing the first SL-BWP to utilizing the second SL-BWP in relation to transmitting the feedback message. In an example, the first UE 520 and/or the second UE 520 may switch from utilizing the first SL-BWP to utilizing the second SL-BWP before transmitting the feedback message. In another example, the first UE 520 and/or the second UE 520 may switch from utilizing the first SL-BWP to utilizing the second SL-BWP after transmitting the feedback message.

In some aspects, when the second UE 520 receives the switching information from the first UE 520 and the switching information indicates that a sidelink resource is scheduled, the second UE 520 may utilize a PSFCH (e.g., PSFCH 425) to transmit a sidelink feedback message to the first UE 520 indicating receipt of the switching information. Based at least in part on receiving the sidelink feedback message from the second UE 520, the first UE 520 may transmit the feedback message over the PUCCH to the TX 510 indicating receipt of switching information by the first UE 520 and by the second UE 520. In some aspects, a duration of a time gap between the first UE 520 receiving the switching information from the TX 510 and the first UE 520 transmitting the feedback message over the PUCCH to the TX 510 may be long enough to account for the first UE 520 receiving the sidelink feedback message from the second UE 520. In some aspects, the switching information received by the first UE 520 may include information regarding sidelink resources to be utilized by the first UE 520 to transmit, to the second UE 520, the switching information directed to the second UE 520. In some aspects, information regarding such sidelink resources may be received by the first UE 520 via a DCI format associated with, for example, DCI format 3.

In some aspects, when the second UE 520 receives the switching information from the first UE 520 and the switching information indicates that no sidelink resource is scheduled, the second UE 520 may utilize the PSFCH (e.g., PSFCH 425) to transmit the sidelink feedback message to the first UE 520 indicating receipt of the switching information. Based at least in part on receiving the sidelink feedback message from the second UE 520, the first UE 520 may transmit the feedback message over the PUCCH to the TX 510 indicating receipt of switching information by the first UE 520 and by the second UE 520. In some aspects, the duration of the time gap between the first UE 520 receiving the switching information from the TX 510 and the first UE 520 transmitting the feedback message over the PUCCH to the TX 510 may be long enough to account for the first UE 520 receiving the sidelink feedback message from the second UE 520.

In some aspects, when the first UE 520 fails to receive the sidelink feedback message from the second UE 520, the first UE 520 may transmit a negative acknowledgment message to the TX 510 indicating a failure associated with switching from utilizing the first SL-BWP to utilizing the second SL-BWP. In this case, the first UE 520 may receive additional switching information to effect the switch from utilizing the first SL-BWP to utilizing the second SL-BWP. In some aspects, the additional switching information may include an additional grant indicating sidelink resources to be utilized by the first UE 520 to transmit the switching information, directed to the second UE 520, to the second UE 520. The additional switching information may also include a new PUCCH resource to be utilized by the first UE 520 to transmit the feedback message to the TX 510.

The techniques and apparatuses associated with dynamic switching among SL-BWPs, as described herein, may assist a UE in dynamically switching from utilizing a first SL-BWP to utilizing a second SL-BWP, the first SL-BWP being associated with a different bandwidth with respect to the second SL-BWP. As a result, the UE may be enabled to efficiently utilize sidelink resources based at least in part on an amount of data to be communicated. Additionally, based at least in part on efficiently utilizing the sidelink resources, UEs designed for efficient power consumption may curtail power consumption associated with performing communication operations. In this way, the UE may enable optimized resource utilization and optimized power consumption while communicating in the sidelink network.

As indicated above, FIG. 5 is provided as an example. Other examples may differ from what is described with regard to FIG. 5.

Figure 6:
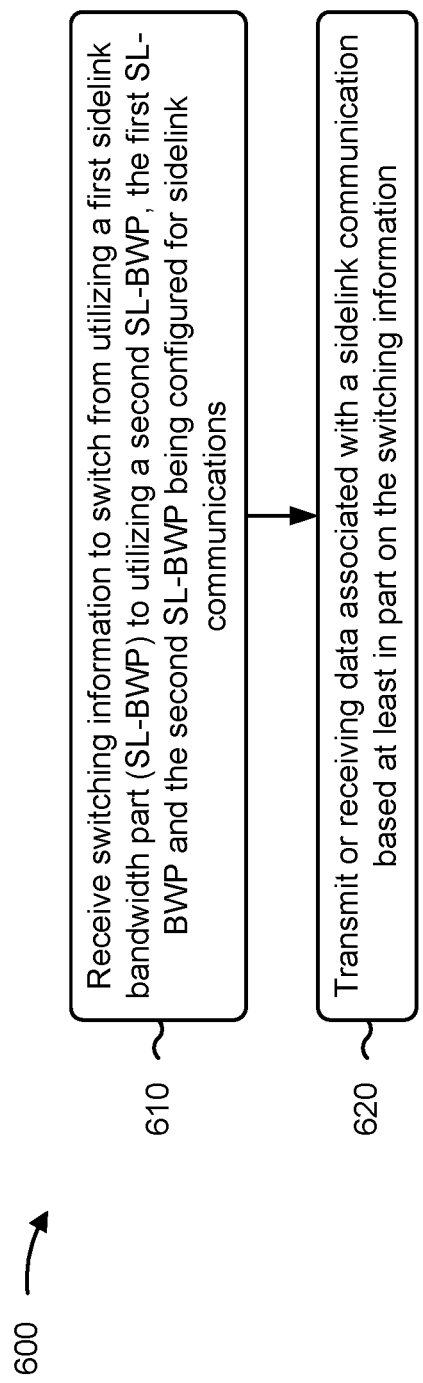
FIG. 6 is a diagram illustrating an example process associated with dynamic switching among SL-BWPs associated with sidelink communication, in accordance with various aspects of the present disclosure.

FIG. 6 is a diagram illustrating an example process 600 performed, for example, by a user equipment (UE), in accordance with various aspects of the present disclosure. Example process 600 is an example where the UE (e.g., UE 120, UE 305, UE 405, UE 520) performs operations associated with dynamic switching among SL-BWPs associated with sidelink communication.

As shown in FIG. 6, in some aspects, process 600 may include receiving switching information to switch from utilizing a first sidelink bandwidth part (SL-BWP) to utilizing a second SL-BWP, the first SL-BWP and the second SL-BWP being configured for sidelink communications (block 610). For example, the UE (e.g., using reception component 702, depicted in FIG. 7) may receive switching information to switch from utilizing a first sidelink bandwidth part (SL-BWP) to utilizing a second SL-BWP, the first SL-BWP and the second SL-BWP being configured for sidelink communications, as described above.

As further shown in FIG. 6, in some aspects, process 600 may include transmitting or receiving data associated with a sidelink communication based at least in part on the switching information (block 620). For example, the UE (e.g., using transmission component 704, depicted in FIG. 7) may transmit or receive data associated with a sidelink communication based at least in part on the switching information, as described above.

Process 600 may include additional aspects, such as any single aspect or any combination of aspects described below and/or in connection with one or more other processes described elsewhere herein.

In a first aspect, process 600 includes switching from utilizing the first SL-BWP to utilizing the second SL-BWP based at least in part on the switching information.

In a second aspect, alone or in combination with the first aspect, receiving the switching information includes receiving the switching information via a physical downlink control channel (PDCCH).

In a third aspect, alone or in combination with one or more of the first and second aspects, receiving the switching information includes receiving downlink control information (DCI) that includes a switching field codepoint that indicates an identifier of the second SL-BWP.

In a fourth aspect, alone or in combination with one or more of the first through third aspects, receiving the switching information includes receiving DCI that includes a UE-specific switch-indication for the UE to switch to utilizing the second SL-BWP.

In a fifth aspect, alone or in combination with one or more of the first through third aspects, receiving the switching information includes receiving group-common DCI that includes respective switch-indications, for a group of UEs including the UE, to switch to utilizing the second SL-BWP, a respective switch-indication associated with the UE being received on a respective carrier-aggregated carrier.

In a sixth aspect, alone or in combination with one or more of the first through third aspects and the fifth aspect, receiving the switching information includes receiving group-common DCI including respective switch-indications, for a group of UEs including the UE, to switch to utilizing the second SL-BWP, the group common DCI including a respective index for the UE to find a respective switch-indication associated with the UE in the group-common DCI.

In a seventh aspect, alone or in combination with one or more of the first through third aspects, the fifth aspect, and the sixth aspect, receiving the switching information includes receiving a group-common DCI including respective switch-indications, for a group of UEs including the UE, to switch to utilizing the second SL-BWP, the method further comprising transmitting, to another UE in the group of UEs, a respective switch-indication associated with the other UE.

In an eighth aspect, alone or in combination with one or more of the first through third aspects and the fifth aspects to seventh aspects, receiving the switching information includes receiving a group-common DCI including respective switch-indications, for a group of UEs including the UE, to switch to utilizing the second SL-BWP, the method further comprising transmitting a subset of the respective switch-indications to a plurality of UEs in the group of UEs.

In a ninth aspect, alone or in combination with one or more of the first through eighth aspects, process 600 includes switching from utilizing the first SL-BWP to utilizing the second SL-BWP based at least in part on the switching information, and informing another UE associated with the sidelink communication of the switching by the UE.

In a tenth aspect, alone or in combination with one or more of the first through ninth aspects, process 600 includes transmitting, based at least in part on receiving the switching information, a feedback message utilizing an uplink control channel associated with the second SL-BWP when a sidelink resource is scheduled in the second SL-BWP.

In an eleventh aspect, alone or in combination with one or more of the first through ninth aspects, process 600 includes switching from utilizing the first SL-BWP to utilizing the second SL-BWP in relation to transmitting a feedback message associated with receiving the switching information when a sidelink resource is not scheduled in the second SL-BWP.

In a twelfth aspect, alone or in combination with one or more of the first through eleventh aspects, process 600 includes switching from utilizing the first SL-BWP to utilizing the second SL-BWP based at least in part on the switching information, receiving an indication of a sidelink resource, to be utilized for sending information regarding the switching to another UE associated with the sidelink communication, when the sidelink resource is scheduled in the second SL-BWP, and utilizing the sidelink resource to send the information regarding the switching to the other UE.

In a thirteenth aspect, alone or in combination with one or more of the first through twelfth aspects, process 600 includes switching from utilizing the first SL-BWP to utilizing the second SL-BWP, and transmitting a feedback message, based at least in part on receiving the switching information, when a sidelink resource is scheduled in the second SL-BWP, wherein a duration of a time gap between receiving the switching information and transmitting the feedback message is long enough to account for receiving a sidelink feedback message from another UE associated with the sidelink communication.

In a fourteenth aspect, alone or in combination with one or more of the first through thirteenth aspects, process 600 includes transmitting, based at least in part on receiving a negative feedback message from another UE associated with the sidelink communication, a negative feedback message indicating a failure to switch to utilizing the second SL-BWP when a sidelink resource is not scheduled in the second SL-BWP.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
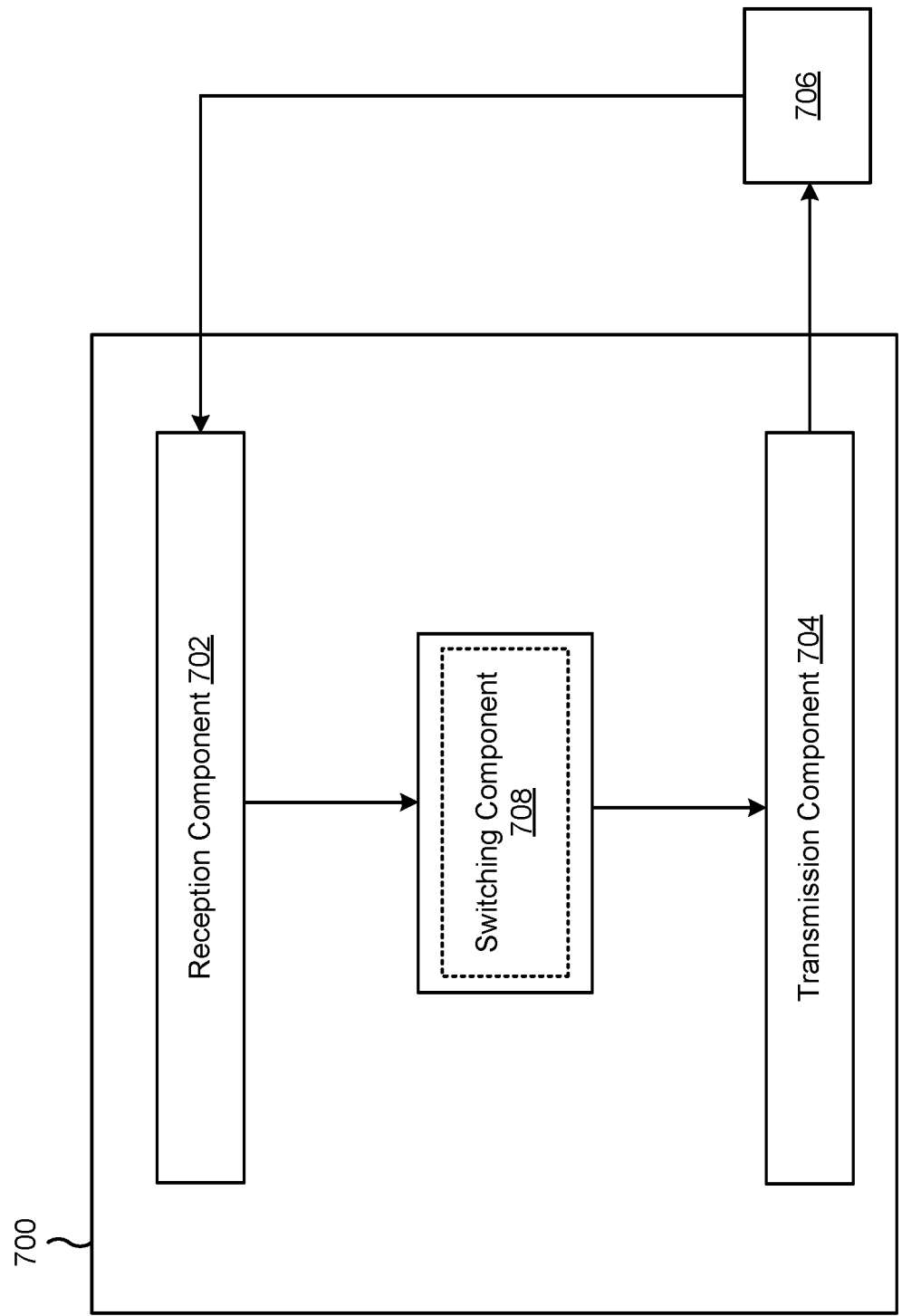
FIG. 7 is a diagram illustrating an example apparatus associated with dynamic switching among SL-BWPs associated with sidelink communication, in accordance with various aspects of the present disclosure.

FIG. 7 is a block diagram of an example apparatus 700 associated with dynamic switching among SL-BWPs associated with sidelink communication. The apparatus 700 may be a user equipment (UE) (e.g., UE 120, UE 305, UE 405, UE 520), or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a switching component 708, among other examples.

In some aspects, the apparatus 700 may be configured to perform one or more operations described herein in connection with FIGS. 3-5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the user equipment (UE) described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the user equipment (UE) described above in connection with FIG. 2. In some aspects, the transmission component 704 may be co-located with the reception component 702 in a transceiver.

The reception component 702 may receive switching information to switch from utilizing a first sidelink bandwidth part (SL-BWP) to utilizing a second SL-BWP, the first SL-BWP and the second SL-BWP being configured for sidelink communications. The transmission component 704 may transmit or receive data associated with a sidelink communication based at least in part on the switching information.

The switching component 708 may switch from utilizing the first SL-BWP to utilizing the second SL-BWP based at least in part on the switching information.

The switching component 708 may inform another UE associated with the sidelink communication of the switching by the UE.

The transmission component 704 may transmit, based at least in part on receiving the switching information, a feedback message utilizing an uplink control channel associated with the second SL-BWP when a sidelink resource is scheduled in the second SL-BWP.

The switching component 708 may switch from utilizing the first SL-BWP to utilizing the second SL-BWP in relation to transmitting a feedback message associated with receiving the switching information when a sidelink resource is not scheduled in the second SL-BWP.

The reception component 702 may receive an indication of a sidelink resource, to be utilized for sending information regarding the switching to another UE associated with the sidelink communication, when the sidelink resource is scheduled in the second SL-BWP.

The switching component 708 may utilize the sidelink resource to send the information regarding the switching to the other UE.

The transmission component 704 may transmit a feedback message, based at least in part on receiving the switching information, when a sidelink resource is scheduled in the second SL-BWP, wherein a duration of a time gap between receiving the switching information and transmitting the feedback message is long enough to account for receiving a sidelink feedback message from another UE associated with the sidelink communication.

The transmission component 704 may transmit, based at least in part on receiving a negative feedback message from another UE associated with the sidelink communication, a negative feedback message indicating a failure to switch to utilizing the second SL-BWP.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of aspects of the present disclosure:

Aspect 1: A method of wireless communication performed by a user equipment (UE), comprising: receiving switching information to switch from utilizing a first sidelink bandwidth part (SL-BWP) to utilizing a second SL-BWP, the first SL-BWP and the second SL-BWP being configured for sidelink communications; and transmitting or receiving data associated with a sidelink communication based at least in part on the switching information.

Aspect 2: The method of aspect 1, further comprising: switching from utilizing the first SL-BWP to utilizing the second SL-BWP based at least in part on the switching information.

Aspect 3: The method of any of aspects 1-2, wherein receiving the switching information includes receiving the switching information via a physical downlink control channel (PDCCH).

Aspect 4: The method of any of aspects 1-2, wherein receiving the switching information includes receiving downlink control information (DCI) that includes a switching field codepoint that indicates an identifier of the second SL-BWP.

Aspect 5: The method of any of aspects 1-2, wherein receiving the switching information includes receiving downlink control information (DCI) that includes a UE-specific switch-indication for the UE to switch to utilizing the second SL-BWP.

Aspect 6: The method of any of aspects 1-2, wherein receiving the switching information includes receiving group-common downlink control information (DCI) that includes respective switch-indications, for a group of UEs including the UE, to switch to utilizing the second SL-BWP, a respective switch-indication associated with the UE being received on a respective carrier-aggregated carrier.

Aspect 7: The method of any of aspects 1-2, wherein receiving the switching information includes receiving group-common downlink control information (DCI) including respective switch-indications, for a group of UEs including the UE, to switch to utilizing the second SL-BWP, the group common DCI including a respective index for the UE to find a respective switch-indication associated with the UE in the group-common DCI.

Aspect 8: The method of any of aspects 1-2, wherein receiving the switching information includes receiving a group common downlink control information (DCI) including respective switch-indications, for a group of UEs including the UE, to switch to utilizing the second SL-BWP, the method further comprising: transmitting, to another UE in the group of UEs, a respective switch-indication associated with the other UE.

Aspect 9: The method of any of aspects 1-2, wherein receiving the switching information includes receiving a group common downlink control information (DCI) including respective switch-indications, for a group of UEs including the UE, to switch to utilizing the second SL-BWP, the method further comprising: transmitting a subset of the respective switch-indications to a plurality of UEs in the group of UEs.

Aspect 10: The method of any of aspects 1-9, further comprising: switching from utilizing the first SL-BWP to utilizing the second SL-BWP based at least in part on the switching information; and informing another UE associated with the sidelink communication of the switching by the UE.

Aspect 11: The method of any of aspects 1-10, further comprising: transmitting, based at least in part on receiving the switching information, a feedback message utilizing an uplink control channel associated with the first SL-BWP when a sidelink resource is scheduled in the first SL-BWP; and transmitting, based at least in part on receiving the switching information, a feedback message utilizing an uplink control channel associated with the second SL-BWP when a sidelink resource is scheduled in the second SL-BWP.

Aspect 12: The method of any of aspects 1-11, further comprising: switching from utilizing the first SL-BWP to utilizing the second SL-BWP in relation to transmitting a feedback message associated with receiving the switching information when a sidelink resource is not scheduled in the second SL-BWP.

Aspect 13: The method of any of aspects 1-12, further comprising: switching from utilizing the first SL-BWP to utilizing the second SL-BWP based at least in part on the switching information; receiving an indication of a sidelink resource, to be utilized for sending information regarding the switching to another UE associated with the sidelink communication, when the sidelink resource is scheduled in the second SL-BWP; and utilizing the sidelink resource to send the information regarding the switching to the other UE.

Aspect 14: The method of any of aspects 1-13, further comprising: switching from utilizing the first SL-BWP to utilizing the second SL-BWP; and transmitting a feedback message, based at least in part on receiving the switching information, when a sidelink resource is scheduled in the second SL-BWP, wherein a duration of a time gap between receiving the switching information and transmitting the feedback message is long enough to account for receiving a sidelink feedback message from another UE associated with the sidelink communication.

Aspect 15: The method of any of aspects 1-14, further comprising: transmitting, based at least in part on receiving a negative feedback message from another UE associated with the sidelink communication, a negative feedback message indicating a failure to switch to utilizing the second SL-BWP.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to cause the UE to:
      receive group-common downlink control information (DCI) that includes respective switch-indications associated with a group of UEs including the UE, wherein the respective switch-indications include a switch-indication to switch from utilizing a first sidelink bandwidth part (SL-BWP) to utilizing a second SL-BWP, and wherein the first SL-BWP and the second SL-BWP are configured for sidelink communications; and
      transmit or receive data associated with a sidelink communication based at least in part on receiving the group-common DCI.

2. The UE of claim 1, wherein the one or more processors are further configured to cause the UE to:
   switch from utilizing the first SL-BWP to utilizing the second SL-BWP based at least in part on the switching information receiving the group-common DCI.

3. The UE of claim 1, wherein the one or more processors, when receiving the group-common DCI, are configured to cause the UE to receive the respective switch-indications via the group-common DCI over a physical downlink control channel (PDCCH).

4. The UE of claim 1, wherein the one or more processors, when receiving the group-common DCI, are configured to cause the UE to receive a switching field codepoint that indicates an identifier of the second SL-BWP.

5. The UE of claim 1, wherein the switch-indication is for the UE to switch to utilizing the second SL-BWP.

6. The UE of claim 1, wherein the one or more processors, when receiving the group-common DCI, are configured to cause the UE to receive the switch-indication on a respective carrier-aggregated carrier.

7. The UE of claim 1, wherein the group-common DCI includes a respective index for the UE to find the switch-indication in the group-common DCI.

8. The UE of claim 1, wherein the one or more processors are further configured to cause the UE to:
   transmit, to another UE in the group of UEs, a respective switch-indication associated with the other UE.

9. The UE of claim 1, wherein the one or more processors are further configured to cause the UE to:
   transmit a subset of the respective switch-indications to a plurality of UEs in the group of UEs.

10. The UE of claim 1, wherein the one or more processors are further configured to:
    switch from utilizing the first SL-BWP to utilizing the second SL-BWP based at least in part on receiving the group-common DCI; and
    inform another UE associated with the sidelink communication of the switching by the UE.

11. The UE of claim 1, wherein the one or more processors are further configured to:
    transmit based at least in part on receiving group-common DCI, a feedback message utilizing an uplink control channel associated with the first SL-BWP when a sidelink resource is scheduled in the first SL-BWP; and
    transmit, based at least in part on receiving the group-common DCI, a feedback message utilizing an uplink control channel associated with the second SL-BWP when a sidelink resource is scheduled in the second SL-BWP.

12. The UE of claim 1, wherein the one or more processors are further configured to:
    switch from utilizing the first SL-BWP to utilizing the second SL-BWP based at least in part on receiving the group-common DCI;
    receive an indication of a sidelink resource, to be utilized for sending information regarding the switching to another UE associated with the sidelink communication, when the sidelink resource is scheduled in the second SL-BWP; and
    utilize the sidelink resource to send the information regarding the switching to the other UE.

13. The UE of claim 1, wherein the one or more processors are further configured to:
    switch from utilizing the first SL-BWP to utilizing the second SL-BWP; and
    transmit a feedback message, based at least in part on receiving the group-common DCI, when a sidelink resource is scheduled in the second SL-BWP, wherein a duration of a time gap between receiving the respective switch indications and transmitting the feedback message is long enough to account for receiving a sidelink feedback message from another UE associated with the sidelink communication.

14. A method of wireless communication performed by a user equipment (UE), comprising:
    receiving group-common downlink control information (DCI) that includes respective switch-indications associated with a group of UEs including the UE, wherein the respective switch-indications include a switch-indication to switch from utilizing a first sidelink bandwidth part (SL-BWP) to utilizing a second SL-BWP, and wherein the first SL-BWP and the second SL-BWP are configured for sidelink communications; and
    transmitting or receiving data associated with a sidelink communication based at least in part on receiving the group-common DCI.

15. The method of claim 14, further comprising:
    switching from utilizing the first SL-BWP to utilizing the second SL-BWP based at least in part on receiving the group-common DCI.

16. The method of claim 14, wherein receiving the group-common DCI includes receiving the respective switch-indications via the group-common DCI over a physical downlink control channel (PDCCH).

17. The method of claim 14, wherein receiving the group-common DCI includes receiving a switching field codepoint that indicates an identifier of the second SL-BWP.

18. The method of claim 14, wherein the switch-indication is for the UE to switch to utilizing the second SL-BWP.

19. The method of claim 14, wherein receiving the group-common DCI includes receiving the switch-indication on a respective carrier-aggregated carrier.

20. The method of claim 14, wherein the group-common DCI includes a respective index for the UE to find the switch-indication in the group-common DCI.

21. The method of claim 14, further comprising:
    transmitting, to another UE in the group of UEs, a respective switch-indication associated with the other UE.

22. The method of claim 14, further comprising:
    transmitting a subset of the respective switch-indications to a plurality of UEs in the group of UEs.

23. The method of claim 14, further comprising:
switching from utilizing the first SL-BWP to utilizing the second SL-BWP based at least in part on receiving the group-common DCI; and
informing another UE associated with the sidelink communication of the switching by the UE.

24. The method of claim 14, further comprising:
transmitting, based at least in part on receiving group-common DCI, a feedback message utilizing an uplink control channel associated with the first SL-BWP when a sidelink resource is scheduled in the first SL-BWP; and
transmitting, based at least in part on receiving the group-common DCI, a feedback message utilizing an uplink control channel associated with the second SL-BWP when a sidelink resource is scheduled in the second SL-BWP.

25. The method of claim 14, further comprising:
switching from utilizing the first SL-BWP to utilizing the second SL-BWP based at least in part on receiving the group-common DCI;
receiving an indication of a sidelink resource, to be utilized for sending information regarding the switching to another UE associated with the sidelink communication, when the sidelink resource is scheduled in the second SL-BWP; and
utilizing the sidelink resource to send the information regarding the switching to the other UE.

26. The method of claim 14, further comprising:
switching from utilizing the first SL-BWP to utilizing the second SL-BWP; and
transmitting a feedback message, based at least in part on receiving the group-common DCI, when a sidelink resource is scheduled in the second SL-BWP, wherein a duration of a time gap between receiving the respective switch-indications and transmitting the feedback message is long enough to account for receiving a sidelink feedback message from another UE associated with the sidelink communication.

27. A non-transitory computer-readable medium storing a set of instructions for wireless communication, the set of instructions comprising:
one or more instructions that, when executed by one or more processors of a user equipment (UE), cause the UE to:
receive group-common downlink control information (DCI) that includes respective switch-indications associated with a group of UEs including the UE, wherein the respective switch-indications include a switch-indication to switch from utilizing a first sidelink bandwidth part (SL-BWP) to utilizing a second SL-BWP, and wherein the first SL-BWP and the second SL-BWP are configured for sidelink communications; and
transmit or receive data associated with a sidelink communication based at least in part on receiving the group-common DCI.

28. The non-transitory computer-readable medium of claim 27, wherein the one or more instructions further cause the UE to:
switch from utilizing the first SL-BWP to utilizing the second SL-BWP based at least in part on receiving the group-common DCI.

29. An apparatus for wireless communication, comprising:
means for receiving group-common downlink control information (DCI) that includes respective switch-indications associated with a group of UEs including the UE, wherein the respective switch-indications include a switch-indication to switch from utilizing a first sidelink bandwidth part (SL-BWP) to utilizing a second SL-BWP, and wherein the first SL-BWP and the second SL-BWP are configured for sidelink communications; and
means for transmitting or receiving data associated with a sidelink communication based at least in part on receiving the group-common DCI.

30. The apparatus of claim 29, further comprising:
means for switching from utilizing the first SL-BWP to utilizing the second SL-BWP based at least in part on receiving the group-common DCI.

* * * * *